United States Patent Office 2,732,381
Patented Jan. 24, 1956

2,732,381
LYSIDINE SALTS

Paul Lafumas and Jules Aboulenc, Choisy-le-Roi, France, assignors to Societe des Usines Chimiques Rhone-Poulenc, Paris, France, a French body corporate No Drawing. Application July 21, 1955,
Serial No. 523,614

Claims priority, application France July 27, 1954

3 Claims. (Cl. 260—309.6)

This invention has for its object to provide a new salt of lysidine, possessing marked anti-inflammatory properties and therefore of value in human medicine for the treatment of rheumatism and arthritis.

The new salt of the present invention is lysidine gentisate obtainable according to a feature of the invention, by the action of gentisic acid by lysidine base in a solvent medium. In one embodiment, the reaction is effected in an organic solvent medium and in particular in an aliphatic alcohol or a benzene hydrocarbon. The process may also be carried out by neutralising lysidine with gentisic acid in an aqueous medium and evaporating the aqueous solution obtained.

The invention is illustrated by the following example.

Example

A solution of gentisic acid (306 g.) in ethyl alcohol (1100 cc.) is added to a solution of lysidine (168 g.) in ethyl alcohol (150 cc.) maintained at 70° C. The mixture is left to crystallise overnight and the precipitate obtained is filtered off, washed with ethyl alcohol (500 cc.) and dried in an oven at 80° C. Lysidine gentisate (370 g.) M. P. 1790 C. (dec.) (Kofler), is thus obtained.

A second crop of the salt may be recovered from the mother liquors.

We claim:
1. Lysidine gentisate.
2. A process for preparing a new lysidine salt which comprises reacting gentisic acid with lysidine base in a solvent medium.
3. A process as claimed in claim 2 in which the solvent is an aliphatic alcohol.

No references cited.